United States Patent [19]
Bauer et al.

[11] Patent Number: 4,676,618
[45] Date of Patent: Jun. 30, 1987

[54] DEVICE FOR PRODUCING PHOTOGRAPHIC PICTURES WITH A PLANE FILM PLATFORM

[75] Inventors: Walter Bauer; Jürgen Müller, both of Munich, Fed. Rep. of Germany

[73] Assignee: Agfa-Gevaert Aktiengesellschaft, Leverkusen, Fed. Rep. of Germany

[21] Appl. No.: 825,094

[22] Filed: Jan. 31, 1986

[30] Foreign Application Priority Data

Feb. 16, 1985 [DE] Fed. Rep. of Germany ... 8504399[U]

[51] Int. Cl.[4] .................. G03B 29/00; G03B 17/26; G03B 27/72
[52] U.S. Cl. ................................ 354/76; 354/276; 355/20
[58] Field of Search .............. 355/18, 20; 354/76, 354/79, 86, 276, 288

[56] References Cited

U.S. PATENT DOCUMENTS

| | | | |
|---|---|---|---|
| 2,483,147 | 9/1949 | Mol | 355/20 X |
| 3,674,367 | 7/1972 | Chapman | 355/20 X |
| 3,700,329 | 10/1974 | Mason | 355/20 X |
| 3,751,253 | 8/1973 | Cohn | 354/276 |
| 3,821,760 | 6/1974 | Kennedy et al. | 354/76 |
| 4,075,643 | 2/1978 | Lane | 354/276 X |
| 4,256,392 | 3/1981 | Stemme et al. | 354/288 X |
| 4,481,541 | 11/1984 | Ioannidis et al. | 354/76 X |

FOREIGN PATENT DOCUMENTS 2240507 7/1980 Fed. Rep. of Germany .

Primary Examiner—Donald A. Griffin
Attorney, Agent, or Firm—Michael J. Striker

[57] ABSTRACT

A device for producing photographic pictures from X-ray or UV images projected on an image screen, comprises a film-supporting platform having a slot for introducing a film into the platform and through which the film is removed from the platform. The device further includes a pair of film-transporting rollers positioned outside of the slot and at a distance therefrom. The platform also has at its lower side recesses into which engaging members are pivoted to support a lower edge of each film on the platform and lift the film when the latter is to be removed from the platform.

13 Claims, 3 Drawing Figures

U.S. Patent  Jun. 30, 1987  4,676,618
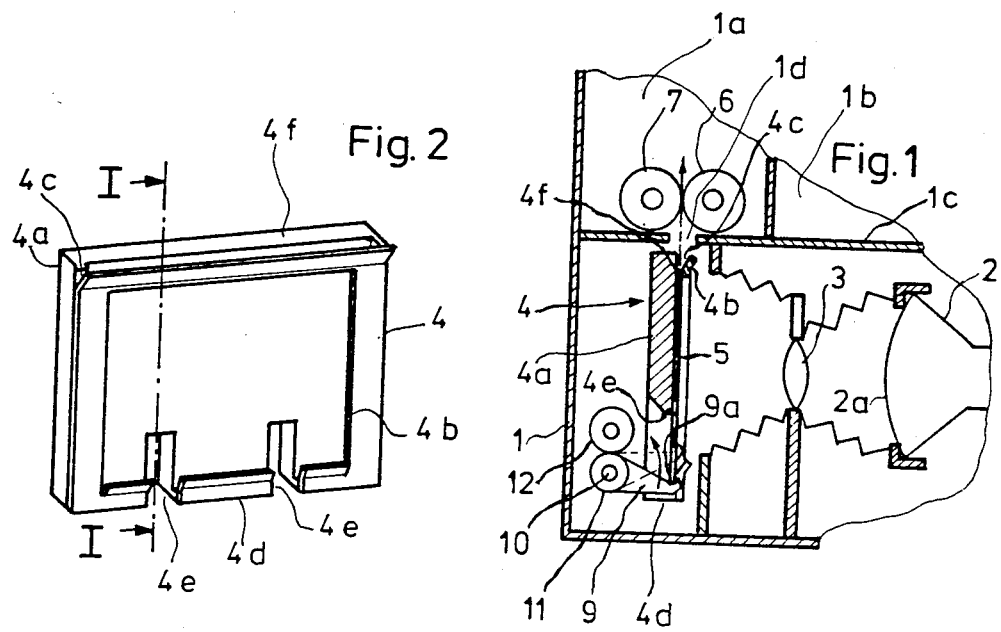
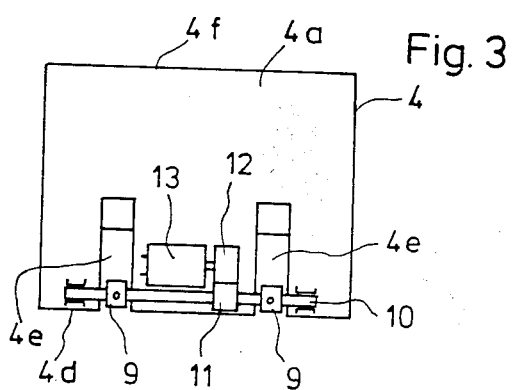

DEVICE FOR PRODUCING PHOTOGRAPHIC PICTURES WITH A PLANE FILM PLATFORM

BACKGROUND OF THE INVENTION

The present invention relates to a device for producing photographic pictures, preferably on an image screen, of X-ray or ultraviolet or the like images, in which device an objective is arranged between an image, preferably an image screen, and a film, in an exposure arrangement which includes a plane film platform.

Such devices are known. Normally a slot is provided in the platform, particularly lengthwise of its front side for the insertion and removal of the plane film to be exposed or the film that has been exposed, respectively.

One of the conventional devices of the foregoing type is disclosed in DE-PS No. 22 40 507. In such stationary plane film platforms of such known devices it has been customary that the image region of the film, through which the film transporting means engages with the platform, was limited so that the entire film surface was not available for surveying. For example, with microfiche platforms in reading apparatus which can be combined with retrieval devices it has been already proposed to use transport roller pairs for transporting microfiches onto and from the platform for the exchange of microfiches on the platform; these roller pairs have been positioned in the direction of transporting. If this mode of transporting of microfiches to the plane film platforms for the picture producing device is utilized at the beginning the thickness of such a platform should be substantially increased and widened and a wider end at both sides of the film would be then waisted for surveying due to the region of the overlapping of the transport rollers with the film being exposed.

SUMMARY OF THE INVENTION

It is an object of the present invention to provide an improved device for producing pictures of X-ray or UV images.

It is another object of this invention to provide a device in which the film would be conveyed to the exposure platform in a very simple manner without covering the image or film region on the platform while utilizing such transporting means as transport rollers.

These and other objects of the present invention are attained by a device for producing photographic pictures of X-ray, UV or the like images appearing on an image screen, comprising a plane film platform for supporting a film in an exposure position; an objective positioned between said image screen and said platform, said platform having a front portion and being formed at said front portion with a slot extended lengthwise of said front portion for feeding therethrough a film to be exposed to and transporting an exposed film from said platform; means for feeding and transporting the film through said slot to load and unload said platform, said transporting means including a pair of transport rollers positioned outside of said slot and a distance therefrom, said platform being provided with another front portion extended parallel to said front portion and formed with at least one recess extended between two opposing flat sides of said platform; and at least one engaging element movable into and from engagement with said recess to support or lift an edge of the film on said platform or lift said edge from said platform.

A plurality of such recesses and a plurality of such engaging elements engageable with said recesses may be provided in the device.

The depth of each recess at a rear side of said platform may be between an upper side of said platform, at which said slot is formed, and a line of contact between said transport rollers.

The platform may have a frame portion receiving a film, said recesses being a cutout in said frame portion.

Each of the engaging elements may be a lever pivotable into and away of a respective recess and having at a free end thereof a notch engageable with the edge of the film on said platform.

The device may further include a shaft, said shaft pivotally supporting said engaging elements thereon, and an electric motor coupled to said shaft.

The recess may widen in the direction of said transport rollers and has a shape of a funnel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a sectional, partially broken, view of a device of the invention, taken along line I—I of FIG. 2;

FIG. 2 is a perspective veiw of the film platform of the device of FIG. 1; and

FIG. 3 is a backside view of the film platform of FIG. 2.

DETAILED DESCRIPTION OF THE PREFERRED EMBODIMENT

Referring now to the drawings in detail, FIG. 1 partially and schematically illustrates a surveying apparatus, the housing of which is designated by a reference numeral 1. A kinescope is denoted by reference numeral 2; 2a is an image screen, and 3 is an objective. Images appearing on the image screen 2a of the kinescope or picture tube 2 are projected to a film 5 situated on a plane film platform 4 by the objective 3.

Housing 1 has housing portions 1a and 1b, in which the non-shown film supply magazine and container for the exposed film as well as transporting means for moving the sheet film 5 from the magazine to the platform and back into the container for the exposed film or instead directly into the closed film development machine are accommodated. The surveying chamber is separated from the treatment chambers 1a and 1b by a partition wall 1c. Above the film platform 4 is provided in the partition wall 1c a slot 1d for guiding therethrough the film sheet 5. Immediately above the slot 1d in the housing wall is positioned a pair of transport rollers 6, 7. Rollers 6 and 7 serve the purpose of transporting the film 5 to the platform 4 and also away from the same.

The platform 4 has a back wall 4a which in the known manner is provided with or can be connected to a pneumatically operated suction device for the film. The platform 5 further has a front frame-like portion 4b which releases a space or chamber for the plane supporting of the film 5 whereby the film chamber is limited between the front side of the platform, facing the housing slot 1d, and the open platform slot 4c for feeding the film 5 to and from the platform. The slot 4c is formed in the upper front portion of the platform as seen from FIG. 2. The slot 4c, the housing slot 1d and the plane of contact of transport rollers 6, 7 are thus in alignment with each other. The platform slot 4c near the platform front side, in which this slot lies, is slightly widened as a funnel towards the slot 1d in order to facilitate the insertion of the film sheet which can be easily curved when applied onto the platform.

Inasmuch as the pair of transport rollers 6, 7 are positioned outside the platform 4 the roller pair is not in the position in which the film situated on the platform can swing from the platform. Upon the insertion of the film through slot 4c in the platform the film can, after being released from rollers 6 and 7, fall downwardly under its weight onto the platform. It should be now obtained that no transporting means for a film interfere with the field of the image of the platform during surveying and the film edge which is positioned below frame 4b must be as narrow as possible. Therefore conventional film transporting means are not suitable.

In the device of this invention, the platform 4 has at its lower front wall or portion 4d, which opposes to the slot 4c, at least one, preferably two recesses 4e, which perforate the front wall 4d, frame-like portion 4b and the back side or wall 4a, and the depth of these recesses in the side walls or back wall of the platform being at least greater than the distance from the upper wall 4f to the line of contact between rollers 6, 7. Each recess 4e extends between two opposite flat sides of the platform over the width of the platform. Two engaging or catching pieces or elements 9 for the film 5 and positioned outside the platform 4 and behind the latter, can be engaged in the respective recesses 4e and can be pivoted or displaced relative to those recesses when the film sheet should be removed through the platform slot 4c and the housing slot 1d to the transport rollers 6, 7.

Each engaging element 9 in the exemplified embodiment is formed as a one-arm lever, at the free end of which a notch 9a, facing the lower end of the film sheet positioned on the platform 4, is provided. All engaging elements 9 are supported on a common shaft 10 which is coupled to an electric motor 13 via a reduction gear 11, 12. If the shaft 10, in the plane of FIG. 1 is rotated in the counter clockwise direction levers 9 will be pivoted from the lower positions in the recesses 4e so that their notches 9a will catch the lower edge of the film 5 during its movement and upon a further pivoting motion in the recesses 4e, will lift film 5 so that the film upper end be engaged between the transport rollers 6 and 7 and transported further. Thereafter the engaging elements or levers 9 are pivoted back to the initial position. This initial position can be within the platform but must lie outside the surveying region defined by the frame 4b. Notches 9a can thereby form in their initial position a support for the respective edge of the film sheet. In the illustrated case the engaging elements lie against the lower side of the platform so that when inserted, the film sheet, upon the release by rollers 6 and 7 simply falls down.

A further modification, not shown in the drawings, is also possible. Sliders in place of pivotable engaging elements can be provided, which sliders can be displaced up and down, for example by a short tackle. When a film should be transported instead of the downward direction in a reverse direction or lateral direction then further recesses, corresponding to recesses 4e, and respective engagement means must be provided at the side of the platform slot 4c so that those engagement means would totally release the platform slot 4c for the release of the film and before the film will be gripped by rollers 6 and 7.

It will be understood that each of the elements described above, or two or more together, may also find a useful application in other types of devices for producing photographic pictures with a plane film platform differing from the types described above.

While the invention has been illustrated and described as embodied in a device for producing photographic pictures with a plane film platform, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for producing photographic pictures of X-ray, UV or the like images appearing on an image screen, comprising a plane film platform for supporting a film in an exposure position; an objective positioned between said image screen and said platform, said platform having a front portion and being formed at said front portion with a slot extended lengthwise of said front portion for feeding therethrough a film to be exposed to and transporting an exposed film from said platform; and means for feeding and transporting the film through said slot to load and unload said platform, said transporting means including a pair of transport rollers positioned outside of said slot and at a distance thereform, said platform being provided with another front portion extended parallel to said front portion and formed with at least one recess extended between two opposing flat sides of said platform; and at least one engaging element pivotable within said recess between two end positions so as to support an edge of the film on said platform when said film is in an exposure position or to lift the edge of the film in the direction towards said transport rollers.

2. The device as defined in claim 1, wherein a plurality of such recesses and a plurality of such engaging elements pivotable within said recesses are provided.

3. The device as defined in claim 2, wherein the depth of each recess in a rear side of said platform is greater than a distance between an upper side of said platform, at which said slot is formed, and a line of contact between said transport rollers.

4. The deivce as defined in claim 3, wherein said platform has a frame portion receiving a film, said recesses being cut out in said frame portion.

5. The device as defined in claim 2, wherein each of said engaging elements is a lever pivotable within a respective recess and having at a free end thereof a notch engageable with the edge of the film on said platform.

6. The device as defined in claim 5, further including a shaft, said shaft pivotally supporting said engaging elements thereon, and an electric motor coupled to said shaft.

7. The device as defined in claim 1, wherein said recess widens in the direction of said transport rollers and has a shape of a funnel.

8. A device for producing photographic pictures of X-ray, UV or the like images appearing on an image screen, comprising a plane film platform for supporting a film in an exposure position; and objective positioned between said image screen and said platform, said platform having a front portion and being formed at said front portion with a slot extended lengthwise of said front portion for feeding therethrough a film to be exposed to and transporting an exposed film from said platform; and means for feeding and transporting the film through said slot to load and unload said platform, said transporting means including a pair of transport rollers positioned outside of said slot and at a distance therefrom, said platform being provided with another front portion extended parallel to said front portion and formed with at least one recess extended between two opposing flat sides of said platform; and at least one engaging element pivotable within said recess between two end positions so as to support an edge when said film is in an exposure position of the film on said platform or lift the edge of the film in the direction towards said transport rollers, said engaging element being a lever and having at a free end thereof a notch engageable with the edge of the film on said platform.

9. The device as defined in claim 8, wherein a plurality of such recesses and a plurality of such engaging elements pivotable within said recesses are provided.

10. The device as defined in claim 9, wherein the depth of each recess in a rear side of said platform is greater than a distance between an upper side of said platform, at which said slot is formed, and a line of contact between said transport rollers.

11. The device as defined in claim 10, wherein said platform has a frame portion receiving a film, said recesses being cut out in said frame portion.

12. The device as defined in claim 9, further including a shaft, said shaft pivotally supporting said engaging elements thereon, and an electric motor coupled to said shaft.

13. The device as defined in claim 8, wherein said recess widens in the direction of said transport rollers and has the shape of a funnel.

* * * * *